United States Patent [19]

Franks

[11] 4,174,478

[45] Nov. 13, 1979

[54] X-RAY INTERFEROMETERS

[75] Inventor: Albert Franks, London, England

[73] Assignee: National Research Development Corporation, London, England

[21] Appl. No.: 812,736

[22] Filed: Jul. 5, 1977

[51] Int. Cl.² ............................ G01N 23/20; G21K 1/00
[52] U.S. Cl. ..................................... 250/276; 250/272; 250/277 R
[58] Field of Search ................. 250/272, 505, 276, 277

[56] References Cited

U.S. PATENT DOCUMENTS 3,446,961  5/1969  Bonse et al. ........................ 250/276

OTHER PUBLICATIONS

Becker et al., "The Skew-Symmetric Two-Crystal X-ray Interferometer," *J. Appl. Cryst.,* (1974) 7, pp. 593-598.

*Primary Examiner*—Alfred E. Smith
*Assistant Examiner*—T. N. Grigsby
*Attorney, Agent, or Firm*—Cushman, Darby & Cushman

[57] ABSTRACT

An X-ray interferometer comprises a plane film of material of low X-ray absorption coefficient, a first surface facing one side of the film, and a second surface facing the other side of the film and substantially opposite the first surface, the first and second surfaces being of high X-ray absorption coefficient and being relatively inclined at a small angle, arranged so that when a beam of X-rays is incident on the film at a glancing angle in the plane in which the small angle of relative inclination lies, a first part of the incident beam is, in sequence, transmitted by the film, reflected by the first surface, and reflected by the film as a first partial beam, and a second part of the incident beam is, in sequence, reflected by the film, reflected by the second surface, and transmitted by the film as a second partial beam which intersects the first partial beam.

6 Claims, 4 Drawing Figures

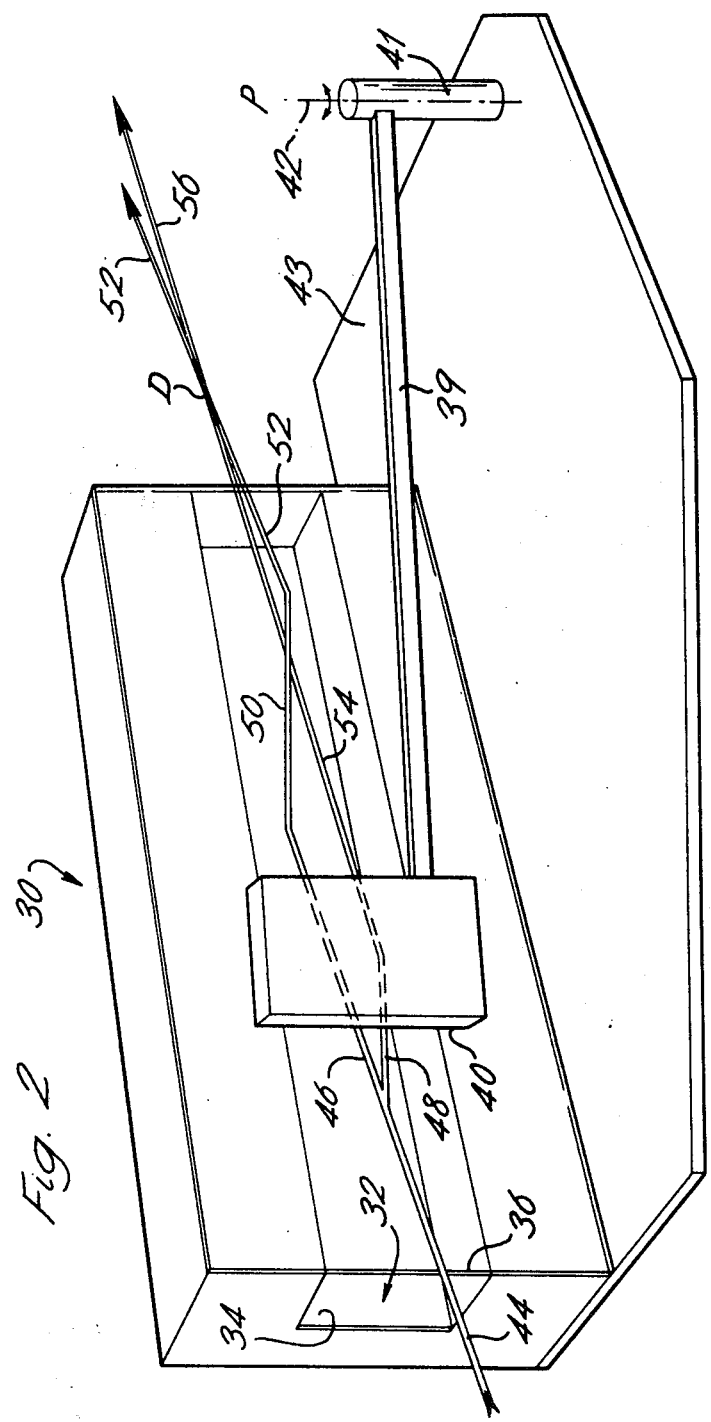

X-RAY INTERFEROMETERS

This invention relates to X-ray interferometers, more particularly to interferometers which operate by division of amplitude.

A known type of amplitude-division interferometer is the Bonse-Hart X-ray interferometer which incorporates a crystal and uses Bragg diffraction for splitting an incident beam and directing the two interfering beams. However, the maximum wavelength at which the instrument can be used is of the order of the crystal lattice spacing, and since the only crystals having the required structural perfection are silicon and germanium, the maximum wavelength is about a few tenths of a nanometer. Further, the fringes are very closely spaced and a further crystal must be used to record them, by a method akin to a Moire technique.

According to the invention, an X-ray interferometer comprises a film of material, first support-means for supporting a first surface facing one side of the film, second support-means for supporting a second surface facing the other side of the film and substantially opposite the first surface, the first and second surfaces being relatively inclined at a small angle, arranged so that when a beam of X-rays is incident on the film at a glancing angle in the plane in which said small angle lies, a first part of the incident beam is, in sequence, transmitted by the film, reflected by the first surface, and reflected by the film as a first partial beam, and a second part of the incident beam is, in sequence, reflected by the film, reflected by the second surface, and transmitted by the film as a second partial beam which intersects the first partial beam.

In one arrangement the film is of a material of low X-ray absorption co-efficient, such as a plastics material or beryllium, and the support-means support first and second plane surfaces of a material of high X-ray absorption coefficient, such as gold.

Usually the interferometer will further comprise either means for rotating at least one support-means about an axis so that the small angle of relative inclination of the first and second surfaces can be varied, or means for moving at least one support-means so that the perpendicular distance between that support-means and the film can be varied. This allows the wavelength at which the interferometer can operate to be varied, and allows the instrument to be used to measure X-ray wavelength.

However, the interferometer may also be used to investigate a sample, which may be placed so that either the first part or the second part of the beam is transmitted through it. In another arrangement, provided a sample to be investigated is of sufficiently high X-ray absorption coefficient, the sample is supported by one of the support-means and itself comprises either the first or the second surface. Usually the facility of varying the angle of inclination will be required for sample investigation, but for comparison of many similar samples at a fixed wavelength, a fixed angle may be tolerable.

Also according to the invention, a device for use in an X-ray interferometer comprises a first body of material having a flatbottomed groove therein, at least a length of the groove bottom comprising a material of high X-ray absorption coefficient, a second body of material having a plane surface facing said length of the groove bottom, the plane surface comprising a material of high X-ray absorption coefficient, means for rotating the second body about an axis parallel to the plane surface and to the groove bottom and perpendicular to the length of the groove, and a plane film of material of low X-ray absorption coefficient covering the groove mouth.

The invention will now be described by way of example with reference to the accompanying drawings in which:

FIG. 2 illustrates one embodiment; and

Figure 1:
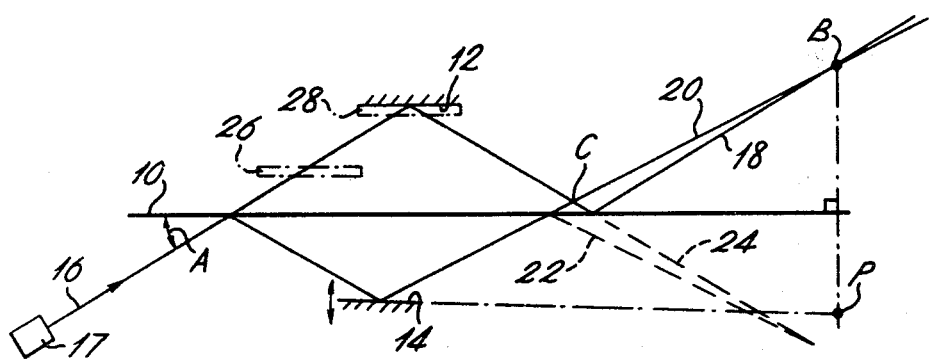
FIG. 1 illustrates schematically in section the general arrangement of the interferometer according to the invention.

In FIG. 1 a film of material 10 and a first plane surface 12 are arranged to be parallel and a short distance apart. A second plane surface 14 on the outer side of the film 10 and approximately opposite the first surface 12 is rotatable about an axis perpendicular to the plane of the drawing, as indicated by the adjacent arrows, so as to be either parallel to the first surface or to make a small angle with it.

When a beam of X-rays 16 from a source 17 is incident on the film 10 in the plane of the figure at a glancing angle A (the angles in the figure are exaggerated for clarity) a first part of the beam is transmitted by the film, reflected by the first surface 12 towards the film, again at the glancing angle, and partly reflected by the film as a first partial beam 18. A second part of the incident beam is reflected by the film, reflected by the second surface 14, and partly transmitted by the film as a second partial beam 20. If the surfaces 12, 14 were precisely parallel, and equidistant from the film 10, the first and second partial beams 18, 20 would precisely coincide, there would be no path difference between them and, depending on their relative phases after the various transmissions and reflections, they would either reinforce each other or completely cancel. Usually, however, the surfaces will not be precisely parallel, the partial beams will have slightly different directions as shown and will intersect at B and form interference fringes.

For maximum intensity and visibility, the film 10 should transmit 50% and reflect 50% of the indicent beam, and the surfaces 12, 14 should be 100% reflecting. The best approach to this is achieved by having the film 10 of a material of low X-ray absorption coefficient, such as beryllium or a plastics material, and by having the surfaces of a material of high X-ray absorption coefficient, such as gold, usually as a coating on a substrate. As is well known, the critical glancing angle below which the reflection of X-rays occurs depends on the absorption coefficient of the reflecting medium. Usually angle A will be a few degrees or less, and small changes in the angle will alter the proportion of reflected to transmitted radiation. The critical angle also depends on the wavelength, and the range over which the interferometer can be used is between about 0.05 nanometers, at which the glancing angle must be a few minutes of arc, up to 30 nanometers at which the glancing angle may approach 10°.

The film of material 10 used as a beam splitter must be thin in order to minimise absorption of the X-ray beam. With glancing incidence the path length of the beam within the film is not insignificant. For long wavelength X-rays the film should be a fraction of a micron in thickness; for shorter wavelengths, a thicker film may be tolerable.

It will also be clear from FIG. 1 that other intefering partial beams are produced, for example those indicated by the broken lines 22, 24. It is an advantage of using the partial beams 18, 20 that each has been reflected once and transmitted once by the film, and the beams provide therefore the most symmetrical arrangement.

Interference also occurs at point C, but here the interfering beams make a large angle with each other and the fringes would be very closely spaced. The fringes produced at point B are much more widely spaced because the interfering beams are almost parallel. At B, the fringe spacing can be altered by altering the angle of the second surface 14.

In a slightly modified arrngement, the first surface 12 is arranged to be rotatable about an axis perpendicular to the plane of the drawing, additionally or alternatively to the rotation of the second surface. Rotation of one or both surface alters the fringe spacing.

In another modification, the perpendicular distance between the film and either one or both of the surfaces is variable: this allows variation of the operating wavelength of the instrument.

The interferometer may be used to determine the wavelength or wavelengths of an incident beam, provided displacement of one surface can be measured, or, if the wavelength is known, a displacement can be measured, using methods analogous to optical techniques in both cases.

In general it is advantageous to adjust the angle of intersection of the partial beams 18 and 20 while maintaining a fixed position of intersection. This can be achieved by adjusting one or both surfaces in such a way that the planes in which the surfaces lie always intersect in a fixed line, which of course is perpendicular to the plane of FIG. 1.

Suppose the surface 12 is fixed and surface 14 is movable as shown in FIG. 1. It can easily be shown by simple geometry that the plane in which the surface 14 lies, which is perpendicular to the plane of FIG. 1, and a plane which is also perpendicular to the plane of FIG. 1, which is perpendicular to the plane of the film 10, and which passes through the point B, intersect in a line indicated by point P in the plane of the Figure. The point P is at a perpendicular distance from the film 10 equal to the distance between the fixed surface 12 and the film 10. If the point P is made a pivot point for the movable surface 14, the surface can be simultaneously translated and rotated and the partial beams 18, 20 will always intersect at the point B.

Further, the interferometer can be used to investigate the properties of a sample. For example one of the interfering beams may be modulated by passage through a specimen to be investigated, positioned for example in the path of the first part of the beam as shown by the chain-dotted lines 26. Alternatively, modulation may be provided by a film of material covering the first surface 12, as indicated by the chain-dotted lines 28, or covering the second surface (not shown). In another arrangement, the specimen to be investigated may itself act as one of the surfaces by reflecting incident X-rays, and in this way the surface properties of the specimen may be investigated, for example polishing, roughness, contouring, deposition or particle size. The types of interference pattern produced can be interpreted by using standard holographic techiques.

When a specimen is introduced, it may be necessary to alter the perpendicular distance between the film and one of the surfaces to accommodate the change of path length and still provide interference fringes at a convenient position.

Referring now to FIG. 2 an oblong block of silica 30 has a flat-bottomed groove 32 in one face along its longest dimension. The groove bottom is gold-coated, as indicated by reference 34, to form a first reflecting surface, and a cellulose nitrate film 36 is held taut across the mouth of the groove. On the opposite side of the film 36 to the grooved face is a glass block 38 with one gold-coated face 40 forming a second reflecting surface. The block 38 is supported by an arm 39 which pivots on a support 41 about an axis 42 passing through the point P. The silica block 30 and the support 41 are fixed to a baseplate 43.

An X-ray beam 44 incident on the film 36 at a suitable glancing angle is partly transmitted as beam 46 and partly reflected as beam 48. Beam 46 is reflected by the gold coating 34 on the groove 32 (the coating can, if necessary, be applied only in the reflecting area) as beam 50 which is reflected by the film 36 as first partial beam 52. Beam 48 is reflected by the gold coated face 40 as beam 54 which is partly transmitted by the film 36 as second partial beam 56. The first and second partial beams interfere in their overlap region D, shown fully shaded.

Typically, for working at a wavelength in the region of 0.15 nanometers, the groove 32 is 0.1 millimeters deep, 2 millimeters wide and 20 millimeters long and film 36 is 0.3 micron thick. To improve clarity, the groove dimensions are not to scale in FIG. 2.

An alternative to a cellulose nitrate film is a polypropylene film which may be reduced in thickness by stretching.

Figure 3A:
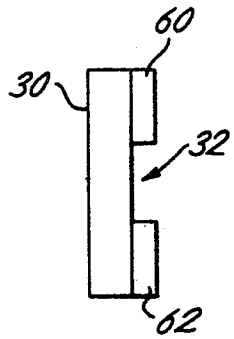
FIG. 3a illustrates one method of constructing the block shown in FIG. 2.
Figure 3B:
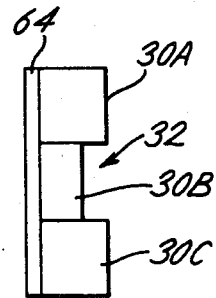
FIG. 3b illustrates a second method of constructing the block shown in FIG. 2.

Two examples of construction of the silica block 30 are shown in FIG. 3 with the groove profile not to scale. In FIG. 3(a) the groove 32 is provided between two spacers 60, 62 attached to the silica block 30, but in this arrangement the spacers are thin and must be polished for precise contact with the block. In another construction shown in FIG. 3(b), the block 30 is constructed in three sections, the outer sections 30A, 30C being thicker than the central section 30B so that the groove 32 is formed. The blocks 30 are cemented to a support 64.

Whatever the arrangement of the silica block, the closer the approach to a monolithic construction, the smaller the stability problems.

We claim:
1. An X-ray interferometer comprising:
a plane film of material;
first support-means for supporting a first surface facing one side of the film;
second support-means for supporting a second surface facing the other side of the film and substantially opposite the first surface, so that the first and second surfaces are relatively inclined at a small angle,
arranged so that when a beam of X-rays is incident on the film at a glancing angle in the plane in which said small angle lies, a first part of the incident beam is, in sequence, transmitted by the film, reflected by the first surface, and reflected by the film as a first partial beam, and a second part of the incident beam is, in sequence, reflected by the film, reflected by the second surface, and transmitted by the film as a second partial beam which intersects the first partial beam.

2. An X-ray interferometer according to claim 1 in which at least one of said support-means is rotatable whereby said small angle of relative inclination can be varied.

3. An X-ray interferometer according to claim 1 in which at least one of said support means is movable whereby the perpendicular distance between the film and the surface supported by that support means can be varied.

4. An X-ray interferometer according to claim 1 in which at least one of said support means is arranged to be simultaneously rotatable and translatable in such a manner that the first and second partial beams intersect at a fixed point.

5. An X-ray interferometer according to claim 1 in which the film is of a material of low X-ray absorption coefficient.

6. An X-ray interferometer comprising:
a first body of material having a flat-bottomed groove therein, at least a length of the groove bottom having a surface of a material of high X-ray absorption coefficient;
a second body of material having a plane surface facing said length of the groove bottom, the plane surface comprising a material of high X-ray absorption coefficient;
means for rotating the second body about an axis parallel to the plane surface and to the groove bottom and perpendicular to the length of the groove;
and a plane film of material of low X-ray absorption coefficient covering the groove mouth;
arranged so that when a beam of X-rays is incident on the film at a glancing angle in a plane perpendicular to the groove bottom and to the plane surface of the second body of material, a first part of the incident beam is, in sequence, transmitted by the film, reflected by said length of the groove bottom having a surface of a material of high X-ray absorption coefficient, and reflected by the film as a first partial beam, and a second part of the incident beam is, in sequence, reflected by the film, reflected by said surface of the second body of material comprising a material of high X-ray absorption coefficient and transmitted by the film as a second partial beam which intersects the first partial beam.

* * * * *

UNITED STATES PATENT AND TRADEMARK OFFICE
CERTIFICATE OF CORRECTION

PATENT NO. : 4,174,478
DATED : November 13, 1979
INVENTOR(S) : Albert FRANKS

It is certified that error appears in the above-identified patent and that said Letters Patent are hereby corrected as shown below:

In the heading

Please add to Item [30] the following omitted

Foreign Application Priority Data:

--July 22, 1976   United Kingdom.......30634/76--

Signed and Sealed this

Eighteenth Day of March 1980

[SEAL]

Attest:

SIDNEY A. DIAMOND

Attesting Officer

Commissioner of Patents and Trademarks